United States Patent [19]

Okuda

[11] 4,050,088
[45] Sept. 20, 1977

[54] APPARATUS FOR SELECTING PLAYBACK OR RECORDING MODES IN MAGNETIC RECORDING AND/OR REPRODUCING APPARATUS

[75] Inventor: Hiroshi Okuda, Kanagawa, Japan

[73] Assignee: Sony Corporation, Tokyo, Japan

[21] Appl. No.: 629,676

[22] Filed: Nov. 6, 1975

[30] Foreign Application Priority Data

Nov. 7, 1974 Japan .............................. 49-128385

[51] Int. Cl.² .......................................... G11B 15/02
[52] U.S. Cl. ...................................... 360/96; 360/90
[58] Field of Search ...................... 360/96, 93, 94, 95, 360/105, 62, 90, 72

[56] References Cited

U.S. PATENT DOCUMENTS

| | | | |
|---|---|---|---|
| 2,793,039 | 5/1957 | Hironimus | 360/90 |
| 3,134,599 | 5/1964 | Roberts | 360/62 |
| 3,813,691 | 5/1974 | Emmert | 360/90 |
| 3,819,128 | 6/1974 | Hori et al. | 360/96 |
| 3,834,651 | 9/1974 | Hashizumi | 360/96 |
| 3,867,722 | 2/1975 | Syohji | 360/96 |
| 3,881,187 | 4/1975 | Nakamichi | 360/96 |
| 3,887,943 | 6/1975 | Katsurayama | 360/96 |

*Primary Examiner*—Jay P. Lucas

*Attorney, Agent, or Firm*—Lewis H. Eslinger; Alvin Sinderbrand

[57] ABSTRACT

Magnetic tape recording and/or reproducing apparatus in which a head base is movable relative to a chassis between an inactive position in which heads mounted on the base are spaced from a tape contained, for example, in a cassette, and an active position in which at least one of the heads is engageable with the tape for recording or reproducing signals thereon. A first mode selecting device can be moved from a rest position to an operative position for moving the head base to its active position and for establishing the tape drive conditions required for reproducing and recording operations. A second mode selecting device can be moved from a rest position to an operative position for selecting the recording mode of the apparatus, for example, for changing over a switch from a condition for the reproducing mode to a condition for the recording mode and for permitting engagement with the tape of an erasing head on the head base. An interconnecting member responds to the transfer of the second mode selecting device to its operative position to move the first mode selecting device to its operative position. Accordingly, the recording mode of the apparatus can be established by moving only the second mode selecting device at a time when the first mode selecting device is in either its rest or operative position.

17 Claims, 7 Drawing Figures

APPARATUS FOR SELECTING PLAYBACK OR RECORDING MODES IN MAGNETIC RECORDING AND/OR REPRODUCING APPARATUS

BACKGROUND OF THE INVENTION

1. Field of the Invention

This invention relates generally to magnetic recording and/or reproducing apparatus, and more particular, is directed to a tape recorder which may be used for dictation and for editing a recorded tape.

2. Description of the Prior Art

Usually, when a pre-recorded tape is to be edited, that is, a portion of the pre-recorded tape is to be erased and new information is to be recorded thereupon, it is necessary to reproduce the previously recorded sounds for locating the point at which the recording of new information is to commence, and then to change-over to the recording mode of operation for thereafter recording the new information. Thus, editing of the tape is accomplished by repeatedly changing-over between the reproducing operation of the tape recorder and the recording operation thereof. Especially, in such editing of the tape, it is important that the newly-recorded information be recorded right after the previously-recorded or retained information without any space or gap therebetween.

However, in a conventional tape recorder, it is necessary to actuate both the recording button and the reproducing button in order to change-over the tape recorder to its recording mode. Furthermore, when the apparatus is changed from its reproducing mode to its recording mode, as during the above-described editing operation, it is necessary to first actuate a stop button for selecting the stop mode of the apparatus, and then to simultaneously actuate the recording and reproducing buttons to change-over the apparatus to its recording mode. The foregoing operations for changing-over the conventional tape recorder from its reproducing mode to its recording mode are troublesome, particularly when such change-overs of the operating mode are to be effected repeatedly, as during dictation or editing of a tape, so that the conventional tape recorder is not well suited for those purposes. Further, with the conventional tape recorder, as aforesaid, spaces or gaps appear on the tape between the potions of the recorded information on the edited tape.

OBJECTS AND SUMMARY OF THE INVENTION

Accordingly, it is an object of this invention to provide a magnetic recording and/or reproducing apparatus which avoids the above described disadvantages of the prior art.

More particularly, it is an object of this invention to provide an apparatus as aforesaid, which can be easily changed-over from its reproducing mode to its recording mode without first changing-over the apparatus to its stop mode.

Another object is to provide an apparatus, as aforesaid, in which the change-over to the recording mode, when the apparatus is in its reproducing mode, can be achieved by actuation of a single control button.

A further object is to provide an apparatus for recording and/or reproducing information on a magnetic tape, as aforesaid, and in which change-over between the recording mode or the reproducing mode and a fast-forward mode, and also change-over from a rewind mode to the recording mode, are prevented.

In accordance with an aspect of this invention, a magnetic tape recording and/or reproducing apparatus having a head base movable relative to a chassis between an inactive position in which each head on the base is spaced from a magnetic tape, for example, contained in a suitably located cassette, and an active position in which at least one head on the base is engaged with the tape for recording or reproducing signals thereon, is provided with a first mode selecting device actuable from a rest position to an operative position for moving the head base to its active position, a second mode selecting device actuable from a rest position to an operative position for selecting a recording mode of the apparatus, and an interconnecting member responsive to actuation of the second mode selecting device to its operative position for actuating the first mode selecting device from its rest position to its operative position.

It is a further feature of the invention to provide the first and second mode selecting devices with respective latching means by which each of the mode selecting devices can be retained in its operative position independently of the other so that, for example, after the first mode selecting device has been actuated to its operative position for selecting the reproducing mode of the apparatus, the second mode selecting device can be actuated to its operative position for selecting the recording mode.

The above, and other objects, features and advantages of the invention, will become apparent from the following detailed description of an illustrative embodiment thereof which is to be read in connection with the accompanying drawings.

DESCRIPTION OF A PREFERRED EMBODIMENT

Figure 1:
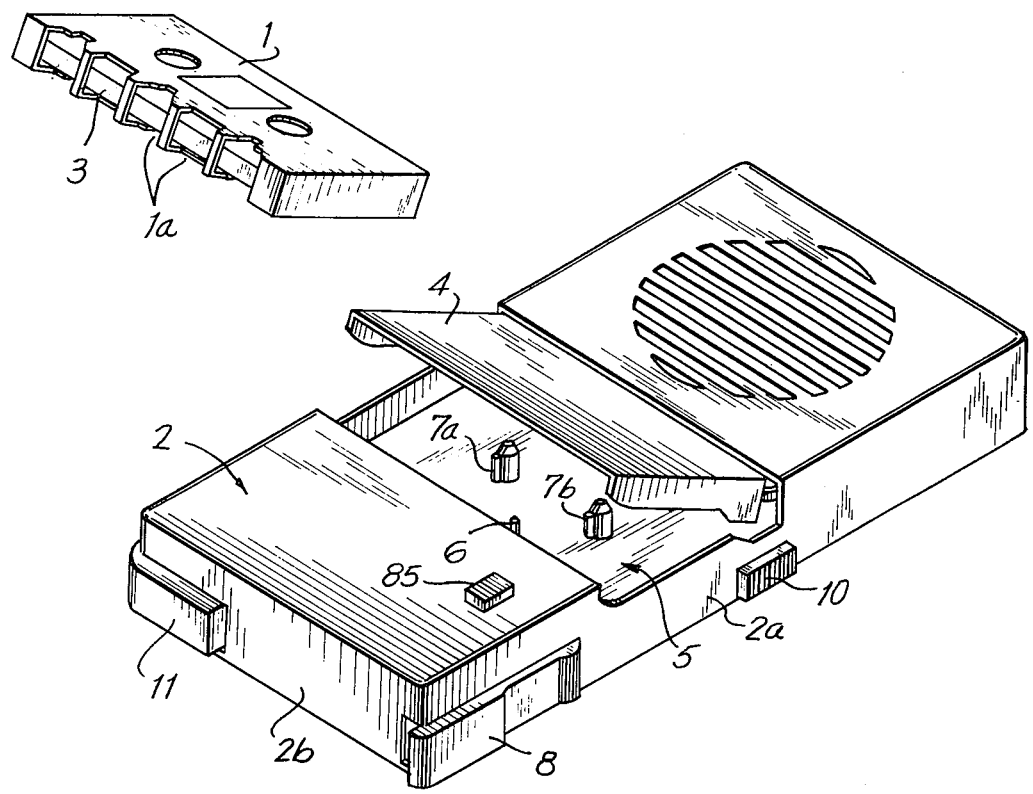
FIG. 1 is a perspective view of a magnetic tape recording and/or reproducing apparatus according to an embodiment of this invention and of a tape cassette for use therein.

Referring to the drawings in detail, and initially to FIG. 1, it will be seen that the invention is there shown applied to a small-sized cassette tape recorder, that is, an apparatus for recording and/or reproducing signals on a magnetic tape 3 contained in a so-called "micro-cassette" 1. Such micro-cassettes are so small that the recording and/or reproducing apparatus designed for use therewith may be provided with a housing or casing 2 dimensioned to fit into the pocket of a jacket or the like. As is usual, the micro-cassette 1 contains rotatable supply and take-up reels (not shown) on which the tape 3 is wound, with the tape between such reels being suitably guided in a run extending along one long side of the cassette housing which has windows or openings 1a therein through which the tape is engageable by one or more magnetic heads and by a tape drive assembly during recording and reproducing operations, as hereinafter described.

As shown generally on FIG. 1, in the illustrated apparatus according to this invention, the housing 2 is formed with a cassette-receiving or mounting portion 5 which is adapted to be covered or closed by a lid 4 after the cassette 1 has been positioned therein. A capstan 6 and reel-drive shafts 7a and 7b project into the cassette-receiving portion 5 of the housing so that, when a cassette 1 is positioned in such cassette-receiving portion 5, capstan 6 will project into the cassette housing in back of the run of the tape 3 extending between the supply and take-up reels and the latter will be rotatably coupled with the reel-drive shafts 7a and 7b, respectively.

As is usual in apparatus of the described type, the magnetic tape recording and/or reproducing apparatus according to this invention has a reproducing mode of operation in which the tape 3 in cassette 1 is driven at a predetermined speed in the direction toward the take-up reel on which the tape is wound while signals previously recorded on the tape are being reproduced, a recording mode of operation in which the tape is again driven at the predetermined speed, as aforesaid, while any signals previously recorded on the tape are erased and new signals are recorded on the tape following such erasure, a fast-forward mode of operation in which the take-up reel is rotated at a relatively high speed so as to effect the rapid transfer of th tape from the supply reel to the take-up reel, a rewind mode of operation in which the supply reel is rotated at a relatively high speed so as to effect the rapid return of the tape from the take-up reel back to the supply reel, and a stop mode in which the cassette 1 may be inserted in, or removed from the cassette-receiving portion 5. In order to selectively establish the foregoing modes of the recording and/or reproducing apparatus according to this invention, such apparatus is shown on FIG. 1 to have a forward-rewind button 8 extending from one side 2a of housing 2 adjacent the corner defined by that side 2a and the forward end 2b of the housing, a fast-forward button 10 projecting from side 2a, and a record button 11 projecting from the front end 2b adjacent the corner defined by the latter and the side remote from side 2a. As hereinafter described in detail, selective actuations of buttons 8, 10 and 11 are effective to control a change-over mechanism shown on FIG. 2 so as to establish the various modes of operation of the apparatus.

Figure 2:
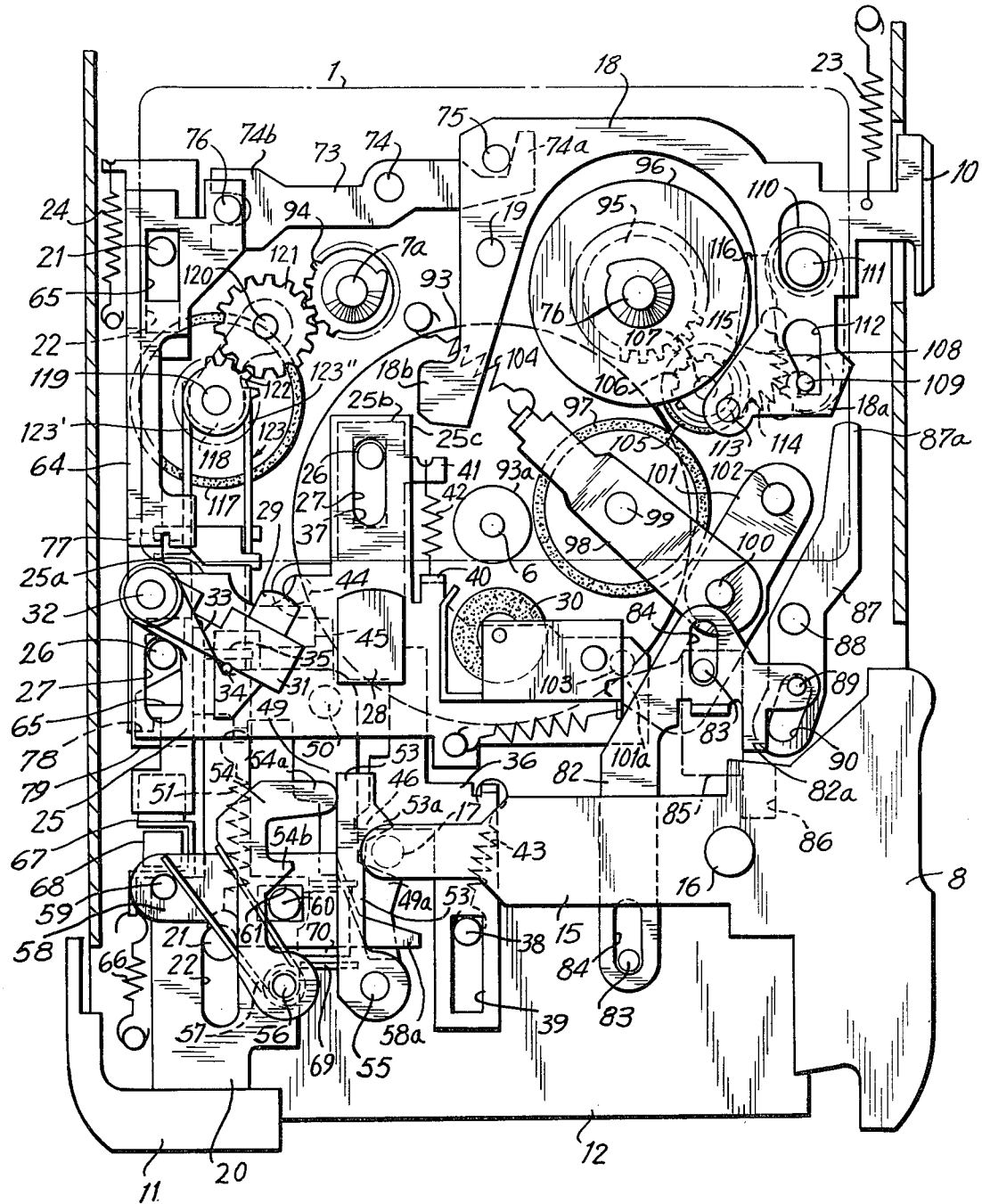
FIG. 2 is an enlarged plan view of a change-over mechanism of the apparatus shown on FIG. 1, and in which the stop mode of the change-over mechanism is shown.

More particularly, as shown on FIG. 2, forward-rewind button 8 is formed as an integral part of the head portion of a generally T-shaped lever 15 which is pivoted on a pivot pin 16 carried by a chassis 12. The stem portion of lever 15 has a pin 17 fixed to its free end. The fast-forward button 10 is shown to project integrally from one leg of a generally horseshoe-shaped lever 18 which is pivoted, at its other leg, on a pivot pin 19 carried by chassis 12. The lever 18 is urged in the counter-clockwise direction to the position shown on FIG. 2 by a tension spring 23. The record button 11 is fixed on the forward end of a record slide member 20 which is guided for movements in the backward and forward directions relative to chassis 12 by means of a pair of guide pins 21 fixed on chassis 12 and slidably received in a pair of oblong holes 22 formed in record slide member 20. The record slide member 20 is urged in the forward direction to a rest position shown on FIG. 2 by a tension spring 24.

A conventional head base 25 is provided with a pair of oblong holes 27 which slidably receive a pair of guide pins 26 fixed on the chassis 12 so as to mount head base 25 for movement relative to chassis 12 in the forward and rearward directions. A magnetic recording and/or reproducing head 28 is fixed on a central portion of head base 25. A magnetic erasing head 29 and a pinch roller 30 are arranged on base 25 at the left- and right-hand sides of magnetic recording and/or reproducing head 28. The magnetic erasing head 29 is carried by a support arm 31 which is pivoted on a support pin 32 fixed on head base 25 and urged in the counter-clockwise direction by a torsion spring 33. The counter-clockwise turning of head support arm 31 is restricted by contact of a pin 34 depending from arm 31 with an abutment 35 formed on a part of record slide member 20.

A slide plate 36 is arranged under the head base 25 and is formed with oblong holes 37 and 39 in a backward end portion of slide plate 36 and in a forward end portion thereof, respectively. The guide pin 26 fixed on chassis 12 is slidably received in oblong hole 37 of slide plate 36 as well as in the oblong hole 27 of head base 25, and another guide pin 38 is fixed on chassis 12 slidably received in oblong hole 39. Thus, slide plate 36 is also mounted for slidable movements in the forward and rearward directions in respect to chassis 12. A tension spring 42 extends between an anchor 40 formed on a part of head base 25 and an anchor 41 formed on the backward end portion of slide plate 36, so that head base 25 and slide plate 36 are connected with each other through tension spring 42. The slide plate 36 is urged in the forward direction (that is, in the downward direction as viewed on FIG. 2) by a tension spring 43 that is relatively stronger than tension spring 42 and which is connected between guide pin 38 and an anchor on plate 36. A pin 44 is fixed on a backward part of slide plate 36 and is engageable by a rearwardly facing surface of a lateral projection 45 extending from record slide member 20. Further a shoulder or step 46 which faces forwardly on a forward part of slide plate 36 is engageable by pin 17 fixed on lever 15. The forward movement of slide plate 36 under the urging of tension spring 43 is limited by the engagement of guide pins 26 and 38 against the back ends of oblong holes 37 and 39.

Figure 6:
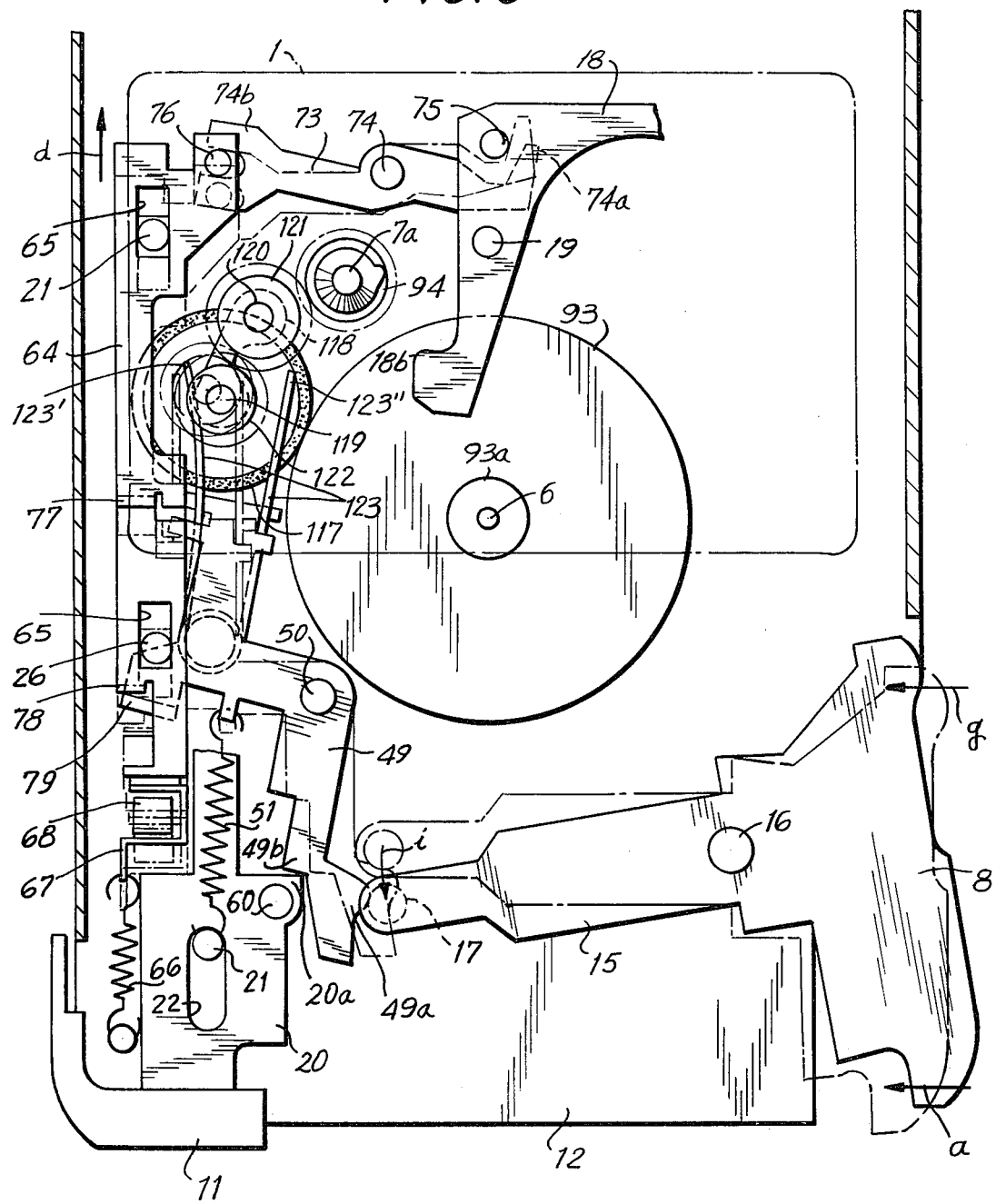

As shown on FIG. 2, and even more clearly on FIG. 6, a generally Z-shaped lever 49 actuable by pin 17 is pivoted on a support pin 50 carried by chassis 12, and is urged in the counter-clockwise direction by a tension spring 51. A triangular projection 49a is formed on a forward end portion 49b of lever 49. When forward-rewind button 8 is in its neutral or stop position shown on FIG. 2 and in broken lines on FIG. 6, pin 17 contacts with the rearwardly facing surface of triangular projection 49a for limiting the counterclockwise rotation of lever 49 by the force of tension spring 51.

The mode change-over mechanism according to this invention is further provided with a first latching lever 53 and a second latching lever 54 which is adjacent lever 53. The latching levers 53 and 54 are respectively pivoted on support pins 55 and 56 fixed to the chassis 12. A triangular projection 53a formed on the end portion of latch lever 53 is engageable by pin 17 on lever 15. The other latch lever 54 is urged in the clockwise direction by a torsion spring 57, and is formed with an angled end portion 54a which is engageable with the first latch lever 53, so that the clockwise rotation of latch lever 54 by the force of torsion spring 57 is transmitted by end portions 54a to latch lever 53.

An inter-connecting member or lever 58 is arranged under latch levers 53 and 54 and is pivoted on a support pin 59 fixed on chassis 12. A hole 61 is formed in inter-connecting lever 58 and receives a pin 60 fixed on a part of record slide member 20. An end portion 58a of inter-connecting lever 58 extends in front of pin 17 on lever 15. The pin 60 extending from record slide member 20 and received in hole 61 of inter-connecting lever 58 is also engageable with a triangular projection 54b formed on the central portion of latch lever 54.

A power switch operating slide member 64 is arranged above record slide member 20 and mounted for movement substantially parallel with the latter, for example, by means of oblong holes 65 formed in slide member 64 and slidably receiving the above described guide pins 21 and 26. A tension spring 66 is connected between the forward end of power switch operating slide member 64 and an anchor on chassis 12 so as to urge slide member 64 in the forward direction. The power switch operating slide member 64 includes a switch operating portion 67 preferably in the form of a leaf spring engaging the actuator of a power switch 68, which is preferably in the form of a slide switch, and which is turned OFF and ON in response to forward and rearward movements, respectively, of member 64. The slide member 20 includes a change-over switch operating portion 69, also preferably in the form of a leaf spring, which operates a change-over switch 70. The switch 70 is associated with conventional circuits (not shown) of the apparatus by which the head 28 is made operative to reproduce and record signals on the tape when slide member 20 is in its rest or forward position, as shown on FIG. 2, and in its rearwardly displaced operative position, as shown on FIG. 4, respectively.

A lever 73 is pivoted on a pin 74 fixed on chassis 12 so as to interconnect horseshoe-shaped lever 18 with power switch operating slide member 64. A pin 75 fixed on horseshoe-shaped lever 18 above pivot 19 for the latter contacts with a sloping surface on an end portion 74a of lever 73, and a pin 76 fixed on the back end portion of power switch operating slide member 64 is engaged in a forked portion 74b formed on the end of lever 73 remote from end portion 74a.

Figure 3:
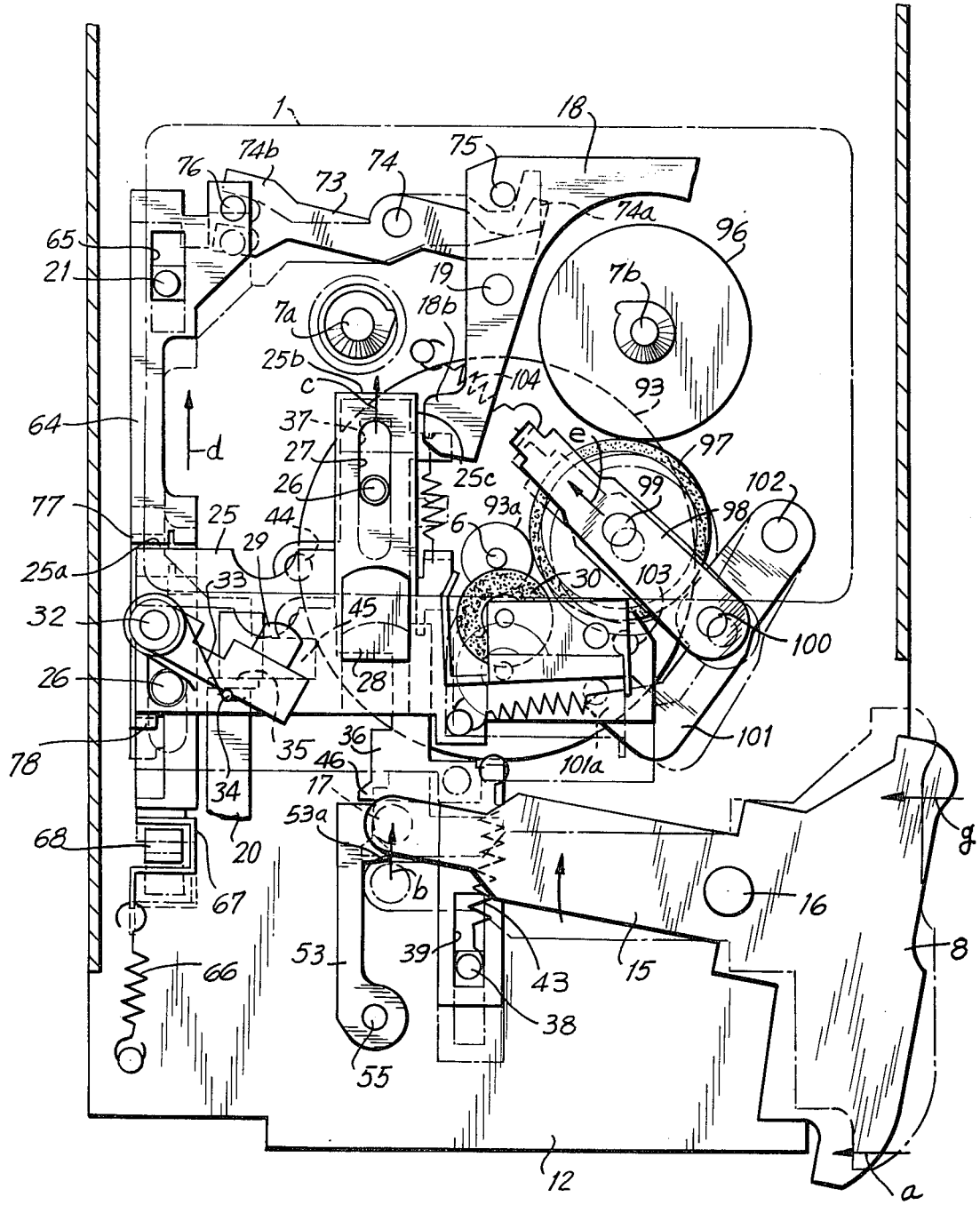
FIGS. 3, 4, 5 and 6 are plan views similar to that of FIG. 2, but showing only those portions of the change-over mechanism which are involved in establishing the reproducing mode, the recording mode, the fast-forward mode and the rewind mode, respectively, of the apparatus.
Figure 4:
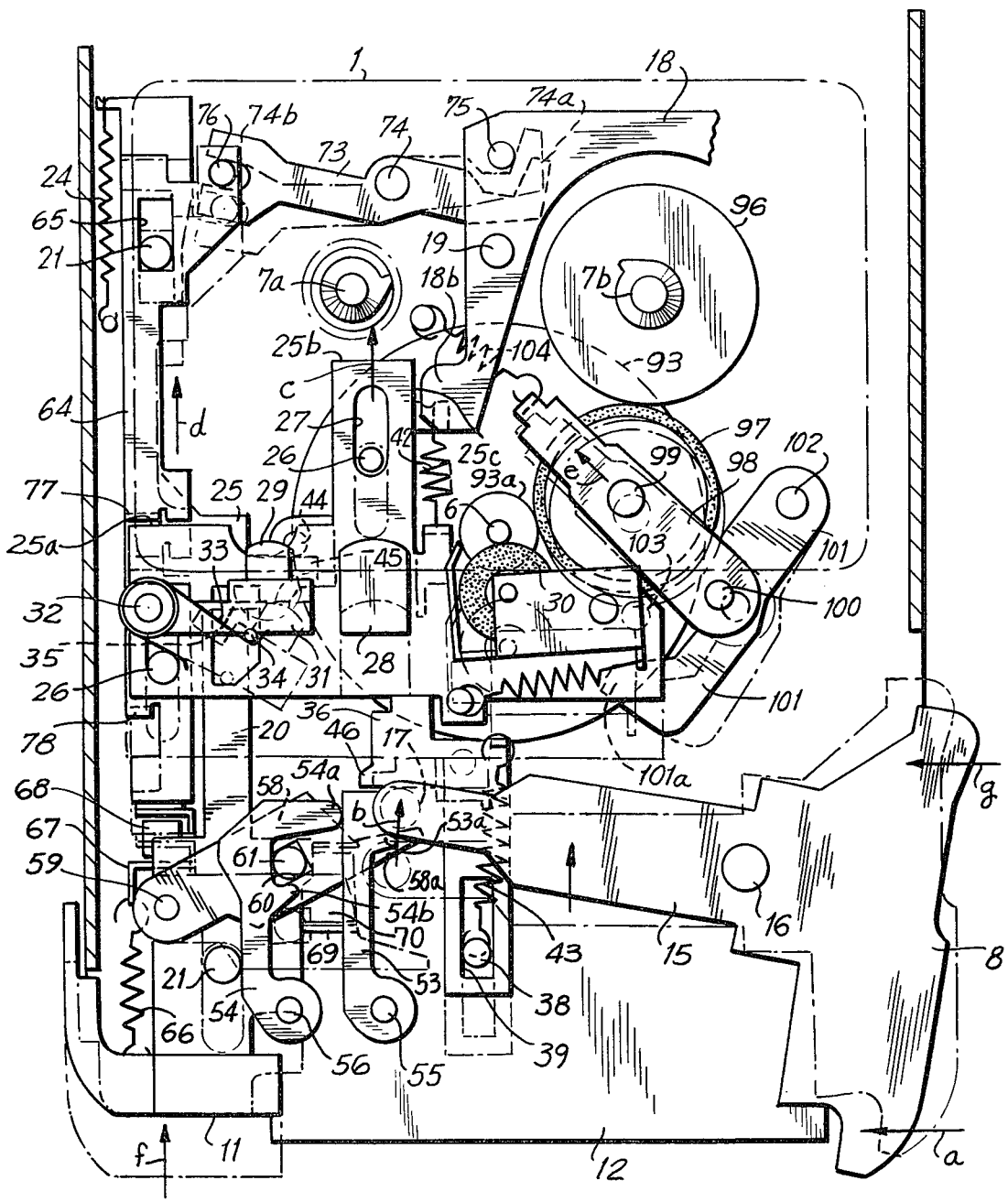

A rearwardly facing edge 25a at the left-hand end portion of head base 25 is engageable with the forward side of an abutment 77 formed on power switch operating slide member 64, as shown particularly on FIGS. 3 and 4. Further, a flange or tab 79 formed on Z-shaped lever 49 is engageable with the forward side of an abutment 78 formed on power switch operating slide member 64, as shown particularly on FIG. 6.

Figure 7:
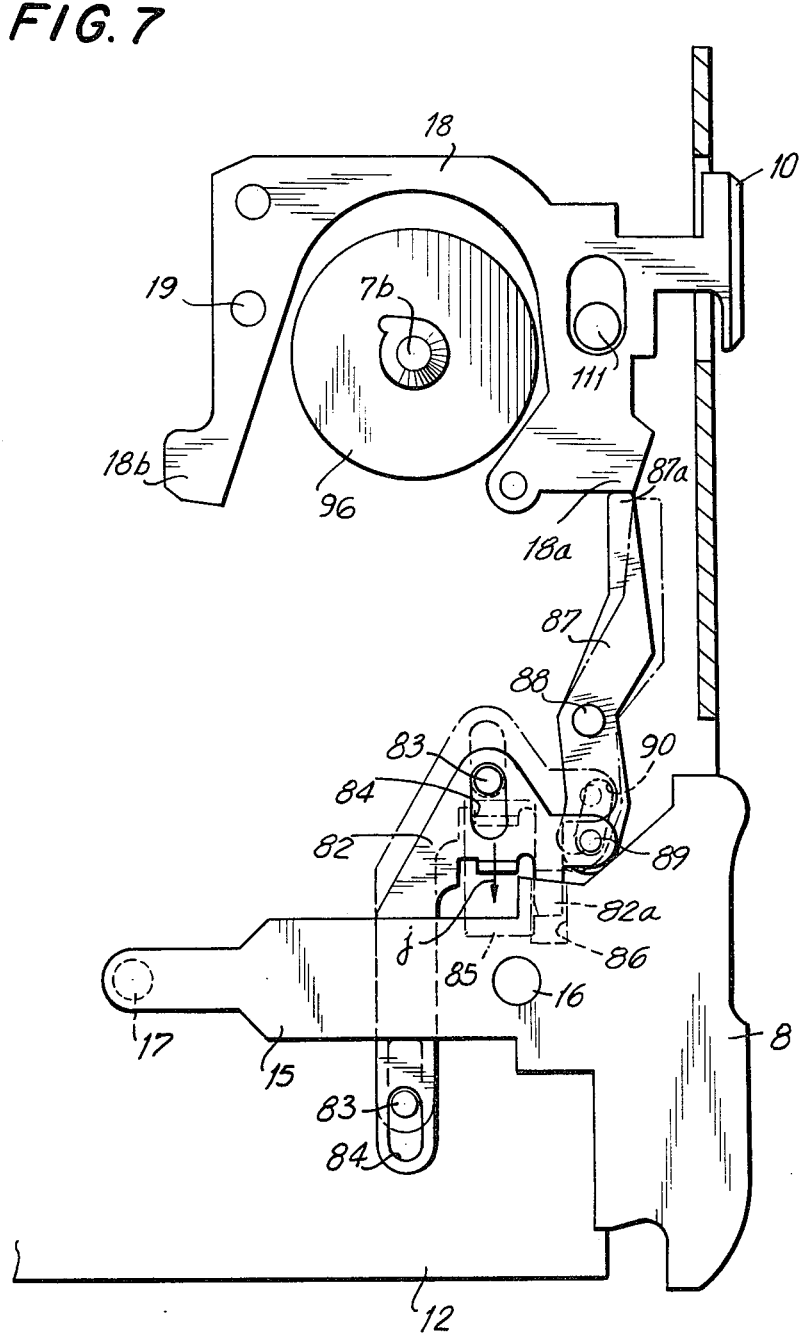
FIG. 7 is a plan view similar to that of FIG. 2, but showing only those portions of the change-over mechanism that are involved in locking the same in its stop mode.

The mode change-over mechanism according to this invention is also shown to be provided with a lock member 82 (FIGS. 2 and 7) for locking such mechanism in its stop mode. Such lock member 82 is shown to have oblong holes 84 slidably receiving guide pins 83 fixed on chassis 12 so that lock member 82 is guided for slidable movements relative to chassis 12 in the backward and forward directions. A lock button 85, which is shown in full lines on FIG. 1 and in broken lines on FIG. 2 and 7, is fixed on lock member 82 and projects upwardly through a slot (not shown) in the top wall of housing 1. A lock projection 82a formed on lock member 82 is engageable in a keeper or hole 86 formed in T-shaped lever 15 for locking the latter in its rest or neutral position when member 82 is moved forwardly from the position of FIG. 2 to that shown on FIG. 7. A lock lever 87 is associated with lock member 82 for locking the horeshoe-shaped lever 18, and is pivoted on a pin 88 fixed on chassis 12. A pin 89 fixed on one end of lock member 82 is slidably received in an oblique oblong hole 90 formed in one end portion of lock lever 87 so that the latter is angularly displaced between the positions shown in full lines and broken lines on FIG. 7 in response to forward and rearward movements, respectively, of lock member 82. The opposite end 87a of lock lever 87 is movable into and out of the path of travel of one end 18a of the horseshoe-shaped lever 18 in the below described manner.

Further, as shown particularly on FIG. 5, the end 18b of horseshoe-shaped lever 18 remote from the end 18a is movable into and out of the path of travel of the rearwardly facing end surface of the central portion of head base 25 in the below described manner.

The tape drive system for the recording and/or reproducing apparatus according to this invention will now be described.

The capstan 6 and the reel drive shafts 7a and 7b are rotatably supported on the chassis 12 in the usual manner. The capstan 6 is interconnected with an electric motor (not shown) through a fly wheel 93 fixed concentrically in respect to capstan 6 and a belt (not shown). A gear 94 is fixed on the lower end of the reel drive shaft 7a which is intended to engage the supply reel in a cassette 1. A gear 95 and a drive flange 96 are fixed on the lower end portion of the reel drive shaft 7b which is intended to engage the take-up reel. An idler wheel 97 is provided for movement into and out of engagement with the peripheral surface of a reduced diameter cylindrical portion or hub 93a formed concentrically on fly wheel 93 and with the peripheral surface of drive flange 96. More particularly, idler wheel 97 is shown to be supported by a shaft 99 rotatably mounted on a support member 98 which is connected at one end, as by a pin 100, with an idler operating lever 101. The lever 101 is pivoted, at one end, on a support pin 102 fixed on chassis 12. The other or free end 101a of lever 101 is engageable by a pin 103 depending from the right-hand end portion of head base 25, as shown in broken lines on FIG. 2. The support member 98 is urged longitudinally by a tension spring 104 in the direction to engage idler wheel 97 with hub 93a and drive flange 96, as shown on FIGS. 3 and 4, for driving reel drive shaft 7b during reproducing and recording operations of the apparatus.

An idler wheel 105 and a gear 106 are arranged adjacent to fly wheel 93 and to gear 95 on reel drive shaft 7b. The idler 105 and gear 106 are fixed on a common shaft 107 which is rotatably mounted on a generally T-shaped lever 108, and are respectively engageable with fly wheel 93 and gear 95 for driving reel drive shaft 7b during fast-forward operation of the apparatus. The lever 108 is pivotally connected with another lever 110 through a pin 109, and the lever 110 is pivoted on a support pin 111 fixed on chassis 12. A cam slot or hole 112 is formed in end portion 18a of horseshoe-shaped lever 18. The pin 109 is slidably received in cam slot 112 and is urged against the shaped edge at the left-hand side of cam slot 112 by a tension spring 114 extended between pin 109 and a pin 113 fixed on end 18a of horseshoe-shaped lever 18. The lever 108 is urged clockwise about pin 109 relative to lever 110 by a tension spring 115 extended between levers 108 and 110. The clockwise turning of lever 108 relative to lever 110 is restricted by contact of an arm portion 116 of T-shaped lever 108 with the pivot pin 111 on which lever 110 is mounted.

In order to drive reel shaft 7a during a rewind operation of the apparatus, an idler wheel 117 is arranged at the side of fly wheel 93 remote from idler wheel 105. The idler wheel 117 is selectively engageable with the peripheral surface of fly wheel 93, and is supported by a rotary shaft 119 rotatably mounted in one end portion of a swing plate 118 which is pivoted, at its other end, on a support pin or axle 120 fixed on chassis 12. A gear 121 is rotatably mounted on support pin or axle 120, and is engaged with gear 94 on reel drive shaft 7a and with a gear 122 fixed on rotary shaft 119. A torsion or hair pin spring 123 is mounted on the rearwardly directed end portion 49c of lever 49, and has legs or end portions 123' and 123" which are engaged in respective recesses of lever 49 and which embrace the free end portion of swing plate 118 for locating the latter in dependence on the position of lever 49.

The above described magnetic tape recording and/or reproducing apparatus according to this invention operates as follows:

FIG. 2 shows the stop mode of the apparatus in which forward-rewind button 8, fast-forward button 10 and record button 11 are located in their rest or inoperative positions. Head base 25 is located in its forward or inactive position in which heads 28 and 29, and pinch roller 30 are separated from the magnetic tape in a cassette 1 shown in broken lines. The power switch 68 is turned OFF in response to the forward displacement of slide member 64 by spring 66, and change-over switch 70 is positioned for the reproducing mode of the circuits in response to the forward displacement of slide member 20 by spring 24. The idler wheels 97, 105 and 117 are located in their inoperative positions, that is, idler wheel 97 is spaced from fly wheel hub 93a and drive flange 96, and idler wheels 105 and 117 are spaced from fly wheel 93.

A. CHANGE-OVER TO THE REPRODUCING MODE FROM THE STOP MODE

In order to change-over to the reproducing mode from the stop mode, the forward end of forward-rewind button 8 is pushed in the direction of the arrow a on FIG. 3 to turn the generally T-shaped lever 15 in the clockwise direction to an operative position shown in full lines. In response to such turning of lever 15, pin 17 moves in the direction of the arrow b. The latch levers 53 and 54 are turned momentarily in the counterclockwise direction against the force of torsion spring 57 by the movement of pin 17 past the triangular projection 53a of lock lever 53 and then pin 17 is locked against the rearwardly facing edge of the projection 53a. Accordingly, the lever 15 and therefore the forward-rewind button 8 are latched or held in one of the operative positions thereof.

Further, the step portion 46 of slide plate 36 is engaged by pin 17 which, in moving in the direction indicated by the arrow b, displaced slide plate 36 in the direction of the arrow c against the force of spring 43. The head base 25, which is connected with slide plate 36 through tension spring 42, is moved with slide plate 36 to its operative or active position shown in full lines on FIG. 3. Accordingly, the magnetic recording and/or reproducing head 28 and the pinch roller 30 are inserted into respective openings of the cassette 1 located in the cassette-mounting section 5 so that the magnetic recording and/or reproducing head 28 contacts with the magnetic tape 3 and the latter is pressed between capstan 6 and pinch roller 30. The operative position of head base 25 is determined by contact of guide pin 26 with the forward end of oblong hole 27.

During movement of head base 25 to its active position, the abutment 77 on power switch operating slide member 64 is pushed by the rearwardly facing surface 25a of head base 25 against the force of spring 66, so that power switch operating slide member 64 is moved in the direction of the arrow d. Accordingly, power switch 68 is turned ON by the switch operating portion 67 of switch operating slide member 64, and the electric motor (not shown) is energized to drive capstan 6 and fly wheel 93.

When head base 25 is moved to its active position, the end 101a of idler operating lever 101 is released by pin 103 on the right-hand portion of head base 25, so that lever 101 is free to be turned in the clockwise direction as support member 98 is pulled by spring 104 in the direction of the arrow e. Accordingly, idler wheel 97 carried by support member 98 is elastically pressed against the small cylindrical portion or hub 93a of fly wheel 93 and against flange 96. Thus, the rotation of fly wheel 93 is transmitted through small cylindrical portion or hub 93a, idler wheel 97 and drive flange 96 for rotating reel drive shaft 7b for the take-up reel at a predetermined speed. Thus, the magnetic tape 3 is driven forwardly at a predetermined rate by capstan 6 and pinch roller 30 and is wound up on the take-up reel while head 28 reproduces signals previously recorded on the tape.

B. CHANGE-OVER TO STOP MODE FROM REPRODUCING MODE

If forward-rewind button 8 is pushed at is backward end in the direction of the arrow g, at a time when the apparatus is in the above described reproducing mode, lever 15 is turned in the counterclockwise direction from the position shown in full lines on FIG. 3. The pin 17 is moved back to its original position shown on FIG. 2, and during such movement of pin 17, latch levers 53 and 54 are turned momentarily in the counterclockwise direction against the force of torsion spring 57 as pin 17 passes over triangular projection 53a of latch lever 53. Thus, pin 17 is released from the latching or locking action of latch lever 53, and forward-rewind button 8 is returned to its neutral or rest position. With the above movement of pin 17, slide plate 36, head base 25 and power switch operating slide member 64 are restored to their original positions by tension springs 43, 42 and 66, respectively. Accordingly, magnetic recording and/or reproducing head 28 and pinch roller 30 are withdrawn forwardly out of the openings of cassette 1, and idler operating lever 101 is turned in the counterclockwise direction by the action on its end 101a of pin 103 fixed on the right-hand end portion of head base 25. The support member 98 is moved back to its original position in the direction to arrow e against the force of tension spring 104 to separate idler 97 from the small cylindrical portion or hub 93a of fly wheel 93 and from flange 96 and thereby halting the rotation of reel drive shaft 7b. With the restoration of power switch operating slide member 64 to its original position, power switch 68 is again turned OFF to deenergize the electric motor so that rotation of capstan 6 is stopped. Thus, the forward movement of tape 3 is halted and return of the apparatus to its stop mode is realized.

C. CHANGE-OVER TO RECORDING MODE FROM REPRODUCING MODE

If record button 11 is pushed in the direction of the arrow f on FIG. 4 at a time when the apparatus is in its reproducing mode, that is, when the forward-rewind button 8 is already located in the operative position shown on FIG. 3, the record slide member 20 is moved in the direction of the arrow d and the pin 60 thereon pushes past the triangular projection 54b of latch lever 54 to momentarily turn the latter in the counterclockwise direction against the force of torsion spring 57. Accordingly, pin 60 passes triangular projection 54b and is locked or retained against the rearwardly facing edge of triangular projection 54b. Thus, record slide member 20 and recording button 11 are held at their operative positions shown on FIG. 4. In response to the movement of record slide member 20 in the direction of arrow d, pin 34 on head arm 31 is released from the abutment 35 on record slide member 20 and, therefore, head arm 31 is turned in the counterclockwise direction by torsion spring 33 to insert magnetic erasing head 29 into the respective opening of cassette 1. Thus, the magnetic tape 3 is contacted by the magnetic erasing head 29. Such counter clockwise turning of head arm 31 by spring 33 is restricted by engagement of pin 34 with head base 25. Further, with the movement of record slide member 20 in the direction of arrow d, change-over switch 70 is changed over to its position for the recording mode by the switch operating portion 69 of record slide member 20. Thus, the recording mode of the apparatus is obtained. It will be noted that, in the course of the change-over from the reproducing mode to the recording mode, connecting lever 58 is turned in the counterclockwise direction by the engagement of pin 60 on record slide member 20 in hole 51, so that the end 58a of connecting lever 58 is moved into contact with pin 17.

D. CHANGE-OVER TO RECORDING MODE FROM STOP MODE

If recording button 11 is pushed in the direction of the arrow f at a time when the apparatus is in the stop mode, record slide member 20 is moved in the direction of arrow d. With such movement of record slide member 20, pin 44 on the back end portion of slide plate 36 is pushed rearwardly by the projection 45 on record slide member 20, so that the slide plate 36 is moved in the direction of arrow c of FIG. 4. As a result of the foregoing, head base 25 is moved to its active position with both heads 28 and 29 engaging the tape, power switch 68 is turned ON, change-over switch 70 is shifted to its position for recording, and idler wheel 97 is engaged with fly wheel hub 93a and drive flange 96 for driving reel drive shaft 7b.

In this change-over operation, lever 58 is turned in the counterclockwise direction by the engagement of pin 60 on record slide member 20 in hole 61 so that pin 17 is moved in the direction of arrow b by the end 58a of connecting lever 58. Accordingly, lever 15 is automatically turned in the clockwise direction. In other words, the forward-rewind button 8 is automatically displaced to its operative position in response to actuation of recording buttom 11 to its operative position.

E. CHANGE-OVER TO STOP MODE FROM RECORDING MODE

If forward-rewind button 8 is pushed at its rearward end in the direction of the arrow g while the apparatus is in its recording mode, lever 15 is turned in the counterclockwise direction and is released from the locking action of projection 53a on latch lever 53, in the same manner as in the above-described change-over to the stop mode from the reproducing mode. Accordingly, forward-rewind button 8 is restored to its neutral or rest position. As pin 17 moves past projection 53a, latch lever 54 is turned in the counterclockwise direction together with the latch lever 53 against the force of torsion spring 57, so that pin 60 on the record slide member 20 is released from the locking action of triangular projection 54b on latch lever 54. Accordingly, record slide member 20, and therefore the recording button 11, are restored to their original or rest positions by tension spring 24. As a result, return to the stop mode is effected in the same manner as in the above-described change-over from the reproducing mode to the stop mode.

In the course of this change-over operation, head supporting arm 31 is turned in the clockwise rotation against the force of torsion spring 33 by the action of abutment 35 on record slide member 20 against pin 34 so that magnetic erasing head 29 is forwardly drawn out from the opening of cassette 1 and is restored to the position relative to head base 25 shown on FIG. 2.

F. CHANGE-OVER TO FAST-FORWARD MODE FROM STOP MODE

Figure 5:
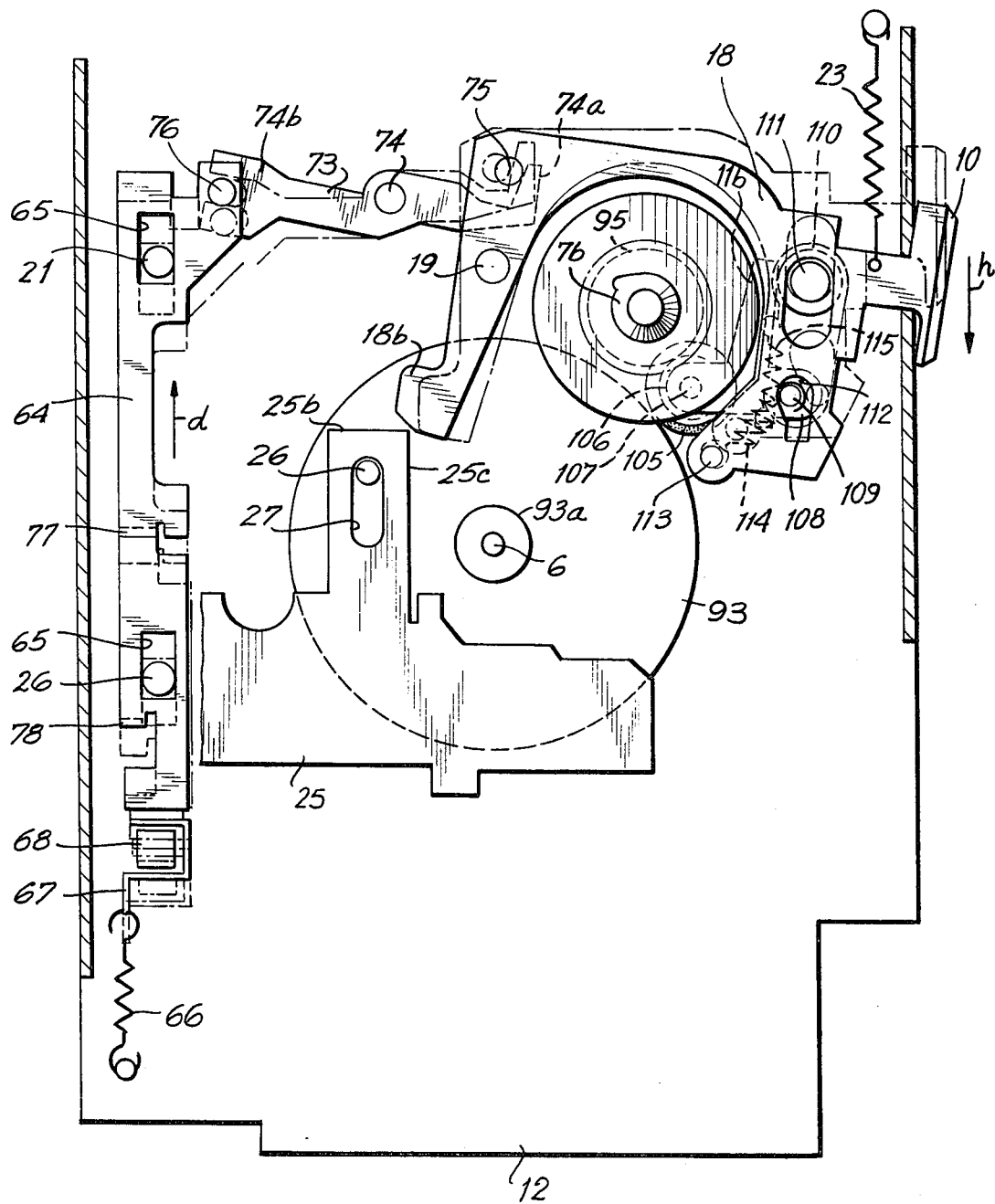

If, with the apparatus in its stop mode, the fast forward button 10 is pushed in the direction of the arrow h on FIG. 5, lever 18 is turned in the clockwise direction against the force of tension spring 23. In response to such clockwise turning of lever 18, the interconnecting lever 73 is turned in the clockwise direction by the action of pin 75 on lever 18 against end portion 74a. Clockwise turning of lever 73 causes power switch operating slide member 64 to move in the direction of arrow d so that the power switch 68 is turned ON. As a result, the electric motor is energized to drive capstan 6. The clockwise turning of lever 18, further causes idler wheel 105 to be elastically pressed against the periphery of fly wheel 93 while gear 106 is engaged with gear 95. More particularly, when lever 18 turns in the clockwise direction, pin 109 rides upwardly in cam slot 112 so that spring 115 can turn levers 108 and 110 in the clockwise direction about pivot pin 111 for pressing idler wheel 105 against fly wheel 93. Thus, the rotation of fly wheel 93 is transmitted to reel drive shaft 7b through idler wheel 105, rotary shaft 107, and gears 106 and 95, for rotating reel drive shaft 7b, and hence the take-up reel coupled therewith, at a relatively high speed. Accordingly, the magnetic tape 3 is wound up on the take-up reel at a relatively high rate, and the fast forward mode is obtained.

In this fast-forward mode, when the finger applied pressure urging button 10 in the direction of arrow h is removed from button 10, spring 23 returns lever 18 in the counterclockwise direction to its original position (FIG. 2). With the restoration of lever 18 to its original position, power switch operating slide member 64 and levers 110 and 108 are restored to their original positions for halting the operation of the motor driving capstan 6 and fly wheel 93, and for separating idler wheel 105 from the fly wheel. Thus, the stop mode is again obtained.

G. CHANGE-OVER TO REWIND MODE FROM STOP MODE

If starting with the apparatus in its stop mode, the forward-rewind button 8 is pushed at its backward end in the direction of the arrow g, the lever 15 is turned in the counter-clockwise direction to move pin 17 in the direction of the arrow i on FIG. 6. In the course of such movement, pin 17 passes over triangular projection 49a of generally Z-shaped lever 49 with the result that projection 49a then retains button 8 in its operative position shown in full lines on FIG. 6. With the movement of the pin 17 over projection 49a, lever 49 is turned in the clockwise direction against the force of tension spring 51 from the position shown in broken lines to that shown in full lines on FIG. 6. Such turning of lever 49 causes the flange or tab 79 thereon to act against abutment 78 on slide member 64, whereby the latter is moved in the direction shown by the arrow d to turn ON the power switch 68. In response to the clockwise turning of lever 49, leg 123' of hair pin spring 123 acts on swing plate 118 to turn the latter in the counterclockwise direction and thereby press idler wheel 117 against the peripheral surface of fly wheel 93. The rotation of fly wheel 93 is transmitted to reel drive shaft 7a coupled with the supply reel through idler wheel 117, rotary shaft 119, and gears 122, 121 and 94, whereby to rotate the supply reel at a relatively high speed in the direction for rewinding the tape thereon. Thus, the rewind mode is obtained.

The illustrated apparatus can also be changed over to rewind mode from the reproducing mode or from the recording mode. In that case, the forward-rewind button 8 is pushed at its backward end in the direction of arrow g in a two-step motion, that is, so as to displace button 8 from the position of FIG. 3 or 4 to the position of FIG. 2 and then to the position of FIG. 6.

H. CHANGE-OVER TO STOP MODE FROM REWIND MODE

When the forward-rewind button 8 is pushed at its forward end in the direction of the arrow a, while the apparatus is in the rewind mode, lever 15 is turned in the clockwise direction. The pin 17 slightly turns the lever 49 in the clockwise direction in passing over triangular projections 49a thereon. Accordingly, the pin 17 is released from the latching action of lever 49 and the forward-rewind button 8 is restored to its neutral or rest position. With the release of pin 17, lever 49 is returned, in the counterclockwise direction, to its original position by tension spring 51 (FIG. 2). The return movement of lever 49 causes swing plate 118 to be turned in the clockwise direction by the legs 123' and 123" of hairpin spring 123, so that idler wheel 117 is separated from fly wheel 93. With the counterclockwise turning of lever 49, power switch operating slide member 64 is returned to its original position by spring 66 to turn OFF power switch 68. Thus, the stop mode is obtained.

It is further to be noted that with the apparatus according to this invention, misoperations thereof, namely change-over operations to the fast forward mode from the reproducing mode or the recording mode, to the reproducing mode or the recording mode from the fast forward mode, and to the recording mode from the rewind mode, are prevented.

In connection with the above, it will be seen that, when head base 25 is located at its active position in the reproducing mode shown on FIG. 3, the right-hand side 25c of the central position of head base 25 confronts the end 18b of the generally horseshoe-shaped lever 18. Accordingly, if the fast forward button 10 is pushed in the direction of the arrow h on FIG. 5 at a time when the apparatus is in its reproducing mode as shown on FIG. 3, the end 18b of lever 18 comes into contact with the side 25c of head base 25 and clockwise turning of the lever 18 is prevented. Therefore, the apparatus cannot be changed over to the fast-forward mode from the reproducing mode.

Further, as shown on FIG. 5, in the fast-forward mode, end 18b of lever 18 confronts a corner of the rear end surface 25b of the central portion of head base 25. Accordingly, if forward-rewind button 8 is pushed at its forward end in the direction of arrow a for establishing the reproducing mode, the central portion of head base 25 comes into contact with end 18b of lever 18 to block movement of head base 25 to its active position. Therefore, the apparatus cannot be changed over to the reproducing mode from the fast-forward mode.

Change-over operations to the fast forward mode from the recording mode, and to the recording mode from the fast forward mode are similarly prevented.

As particularly shown on FIG. 6, a step 49b on the lever 49 is in facing or confronting relation to a step 20a on record slide member 20 in the rewind mode. Accordingly, if the recording button 11 is pushed while the apparatus is in the rewind mode, the step 20a of record slide member 20 comes into contact with step 46b on lever 49. Therefore, movement of record slide member 20 in the direction of arrow f on FIG. 4 is prevented, and so the apparatus cannot be changed over to the recording mode from the rewind mode.

Moreover, in the apparatus according to this invention, the forward rewind button 8, the fast forward button 10 and the recording button 11 can be locked in their original or rest positions when the apparatus is not in use, whereby to securely maintain the apparatus in its stop mode.

More specifically, as shown on FIG. 7, when the lock button 85 is pushed forwardly, that is, in the direction of the arrow j, lock member 82 is moved in the same direction to insert its locking projection 82a into the keeper 86 of lever 15. Accordingly, lever 15 cannot be turned in either the clockwise direction or the counterclockwise direction from its rest position. Further, in response to the forward movement of lock member 82, the lock lever 87 is turned in the counterclockwise direction by the cam action of pin 89 on lock member 82 in the oblique oblong hole 90, so that the end 87a of lock lever 87 faces the forward surface of end 18a of the lever 18. Accordingly, lever 18 is prevented from turning in the clockwise direction and, therefore the fast forward button 10 is locked in its original or rest position.

If recording button 11 is pushed rearwardly, that is, in the direction of arrow f on FIG. 4, at a time when lever 15 is locked by lock member 82, as described above, record slide member 20 can be moved only a small distance in the direction of arrow f, whereupon the interconnecting lever 58 is turned in the counterclockwise direction so that its end 58a comes into contact with pin 17 on lever 15 which is held against movement and further turning of interconnecting lever 58 is prevented. Therefore, the recording button 11 is locked against substantial displacement from its rest position although it can be slightly moved in the direction of arrow $f$. Such slight movement of record slide member 20 is not sufficient to move the pin 60 thereon past the triangular projection 54b on latch lever 54 and, therefore, recording button 11 returns to its rest position as soon as the pressure thereon in the direction of the arrow $f$ is removed therefrom. Further, the slight movement of recording button 11 from its rest position that is possible when lock member 82 is in its operative or locking position is not sufficient to cause power switch 68 to be turned ON.

When the recording and/or reproducing apparatus is to be used, lock button 85 is moved rearwardly, that is, in the direction opposed to the arrow $j$ on FIG. 7 for withdrawing the projection 82a on lock member 82 from the keeper 86 in lever 15, whereby to release the latter. At the same time, lock lever 87 is turned in the clockwise direction to displace its end 87a out of the path of travel of end 18a of lever 18. Accordingly, lever 18 is also unlocked. Thereafter, the buttons 8, 10 and 11 can be selectively actuated to achieve the reproducing or rewind modes, the fast-forward mode, or the recording mode, respectively, of the apparatus as previously described.

Although the invention has been described as applied to an apparatus of the type intended for recording and/or reproducing audio signals on a tape contained in a cassette, it will be clear that the invention may be applied to other types of apparatus, for example, apparatus for recording and/or reproducing video signals or apparatus of the so-called open-reel type.

In any case, it will be seen from the foregoing description of an embodiment of the invention that, in apparatus according to the invention, change-over to the recording mode can be effected merely by actuation of the single button 11 at a time when the apparatus is in either its stop mode or its reproducing mode. Thus, the apparatus is particularly suited for use in recording dictation or for any other uses in which editing of the information recorded on the tape is required.

Having described a particular embodiment of the invention with reference to the accompanying drawings, it is to be understood that the invention is not limited to that particular embodiment, and that various changes and modifications may be effected therein by one skilled in the art without departing from the scope or spirit of the invention as defined in the appended claims.

What is claimed is:

1. A magnetic tape recording and/or reproducing apparatus comprising: a chassis; a head base having magnetic head means thereon for selectively recording and reproducing signals on a tape; means mounting said head base on the chassis for movement relative to the latter between an inactive position, in which said head means is spaced from the tape, and an active position, in which said head means is engageable with the tape; a first mode selecting member selectively manually actuable to a rest position for establishing a stop mode of the apparatus and to an operative position for moving said head base to said active position of the latter; a second mode selecting member manually actuable from a rest position to an operative position; interconnecting means responsive only to actuation of said second mode selecting member to said operative position of the latter for displacing said first mode selecting member from said rest position to said operative position of said first mode selecting member; and mode change-over means for establishing a reproducing mode of the apparatus in response to the actuation of said first mode selecting member to said operative position thereof with said second mode selecting member in said rest position of the latter and for changing-over the apparatus to a recording mode thereof in response to actuation of said second mode selecting member to said operative position of the latter.

2. A magnetic tape recording and/or reproducing apparatus according to claim 1; further comprising first and second independently movable latch means operative to hold said first and second mode selecting member, respectively, in said operative positions thereof, said first latch means being released only in response to the return of said first mode selecting member from said operative position to said rest position thereof, and cooperatively engageable means on said first and second latch means for releasing said second latch means in response to the release of said first latch means.

3. A magnetic tape recording and/or reproducing apparatus according to claim 2; further comprising means yieldably urging said second mode selecting member to its rest position so that said second mode selecting member is returned from its operative position to its rest position upon release of said second latch means.

4. A magnetic tape recording and/or reproducing apparatus according to claim 1; in which said head means includes a magnetic recording and reproducing head fixed on said head base and an erasing head mounted on said head base for movement relative to the latter between inoperative and operative positions; and in which said mode change-over means includes means for disposing said erasing head in said inoperative and operative positions thereof in response to the disposition of said second mode selecting member in said rest and operative positions, respectively, change-over switch means having recording and reproducing conditions for causing said recording and reproducing head to record and reproduce, respectively, signals on the tape, and means for establishing said recording and reproducing conditions of said change-over switch means when said second mode selecting member is in said operative and rest positions thereof, respectively.

5. A magnetic tape recording and/or reproducing apparatus according to claim 4; further comprising tape drive means for advancing the tape during the recording and reproducing of signals thereon, power switch means having ON and OFF conditions corresponding to operative and inoperative conditions, respectively of said tape drive means, and power switch control means normally establishing said OFF condition of said power switch means and being effective to establish said ON condition of the latter in response to said movement of the head base to said active position thereof.

6. A magnetic tape recording and/or reproducing apparatus according to claim 5; in which said tape drive means includes a capstan which is rotated when said power switch means is in said ON condition, and a pinch roller on said head base for pressing the tape against said capstan when said head base is in said active position; and further comprising first and second reel drive shafts adapted for rotational coupling with tape-up and supply reels, respectively, on which the tape is wound, transmission means operative for rotating said first reel drive shaft from said capstan so as to cause the take-up reel coupled therewith to wind the tape thereon at a speed commensurate with the speed of advancement of the tape by said tape drive means, and transmission control means rendering said transmission means inoperative when said head base is in said inactive position and permitting operation of said transmission means in response to movement of said head base to its active position.

7. A magnetic tape recording and/or reproducing apparatus according to claim 6; further comprising third mode selecting means actuable from a rest position to an operative position for causing said power switch control means to establish said ON condition of the power switch means, and additional transmission means operative in response to the movement of said third mode selecting means to said operative position of the latter for causing the relatively high speed rotation of said first reel drive shaft from said capstan, whereby to effect the fast-forwarding of the tape from the supply reel to the take-up reel.

8. A magnetic tape recording and/or reproducing apparatus according to claim 7; further comprising cooperating means on said head base and said third mode selecting means to prevent movement of the latter to said operative position thereof when said head base is in said active position and to prevent movement of said head base from said inactive position to said active position when said third mode selecting means is in said operative position of the latter.

9. A magnetic tape recording and/or reproducing apparatus according to claim 6; in which said first mode selecting member is movable in one direction from said rest position to said operative position thereof and said first mode selecting member is movable in the opposite direction from said rest position to a second operative position; and further comprising means for causing said power switch control means to establish said ON condition of the power switch means in response to the movement of said first mode selecting member to said second operative position thereof, and additional transmission means operative in response to the movement of said first mode selecting member to said second operative position for causing the relatively high speed rotation of said second reel drive shaft from said capstan, whereby to effect the rewinding of the tape on the supply reel.

10. A magnetic tape recording and/or reproducing apparatus according to claim 9; further comprising means for blocking the movement of said second mode selecting member from said rest position to said operative position in reponse to the movement of said first mode selecting member to said second operative position of the latter.

11. A magnetic tape recording and/or reproducing apparatus according to claim 10; further comprising third mode selecting means actuable from a rest position to an operative position for causing said power switch control means to establish said ON condition of the power switch means, still another transmission means operative in response to the movement of said third mode selecting means to its operative position for causing the relatively high speed rotation of said first reel drive shaft from said capstan, whereby to effect the fast-forwarding of the tape from the supply reel to the take-up reel, and cooperating means on said head base and said third mode selecting means to prevent movement of said third mode selecting means to its operative position when said head base is in its active position and to prevent movement of said head base from said inactive position to said active position when said third mode selecting means is in said operative position of the latter.

12. A magnetic tape recording and/or reproducing apparatus according to claim 11; further comprising locking means including a locking member movable from a released position to an engaged position for locking said first mode selecting member in said rest position thereof, and means responsive to movement of said locking member to said engaged position for blocking movement of said third mode selecting means from said rest position to said operative position of the latter; and in which said interconnecting means blocks the movement of said second mode selecting member to said operative position of the latter so long as said first mode selecting member is locked in said rest position thereof.

13. A magnetic tape recording and/or reproducing apparatus according to claim 1; further comprising a locking member movable from a released position to an engaged position for locking said first mode selecting member in said rest position thereof; and in which said interconnecting means blocks the movement of said second mode selecting member to said operative position thereof so long as the first mode selecting member is locked in its rest position.

14. A magnetic tape recording and/or reproducing apparatus according to claim 1; in which said first mode selecting member includes a pivotally mounted control lever carrying a pin and being swingable between said rest and operative positions of the first mode selecting member to move said pin in an arcuate path, said second mode selecting member includes a slide member movable rectilinearly between said rest and operative positions of the second mode selecting member, and said interconnecting means includes a pivotally mounted interconnecting lever having an end portion projecting into said acurate path of the pin and means for swinging said interconnecting lever so as to move said end portion thereof against said pin in the direction to move said control lever to said operative position thereof in response to movement of said slide member to said operative position of the latter.

15. A magnetic tape recording and/or reproducing apparatus according to claim 14; in which said means for swinging said interconnecting lever includes a second pin on said slide member engaging in a slot in said interconnecting lever; and further comprising a first pivoted latch lever having a triangular projection to extend into said arcuate path of the first mentioned pin for holding said control lever in said operative position thereof, a second pivoted latch lever having a triangular projection engageable with said second pin to hold said slide member in said operative position of the latter, said second latch lever being engageable with said first latch lever in the direction to maintain said triangular projection of the latter in said arcuate path, and spring means for urging said second latch lever into engagement with said first latch lever.

16. A magnetic tape recording and/or reproducing apparatus according to claim 1; in which said first mode selecting member is movable in one direction from said rest position to said operative position thereof and said first mode selecting member is movable in the opposite direction from said rest position to a second operative position; and further comprising means for establishing a rewind mode of the apparatus in response to the movement of said first mode selecting member to said second operative position thereof.

17. A magnetic tape recording and/or reproducing apparatus according to claim 16; further comprising an elongated generally rectangular housing having said first mode selecting member extending from one side of the housing adjacent one end of the latter and said second mode selecting member extending from said one end of the housing adjacent the opposite side of the latter.

* * * * *